Dec. 29, 1953   W. B. REEVES   2,664,394
ELECTROCHEMICAL CONVERSION OF HYDROCARBONS
Filed Nov. 26, 1948
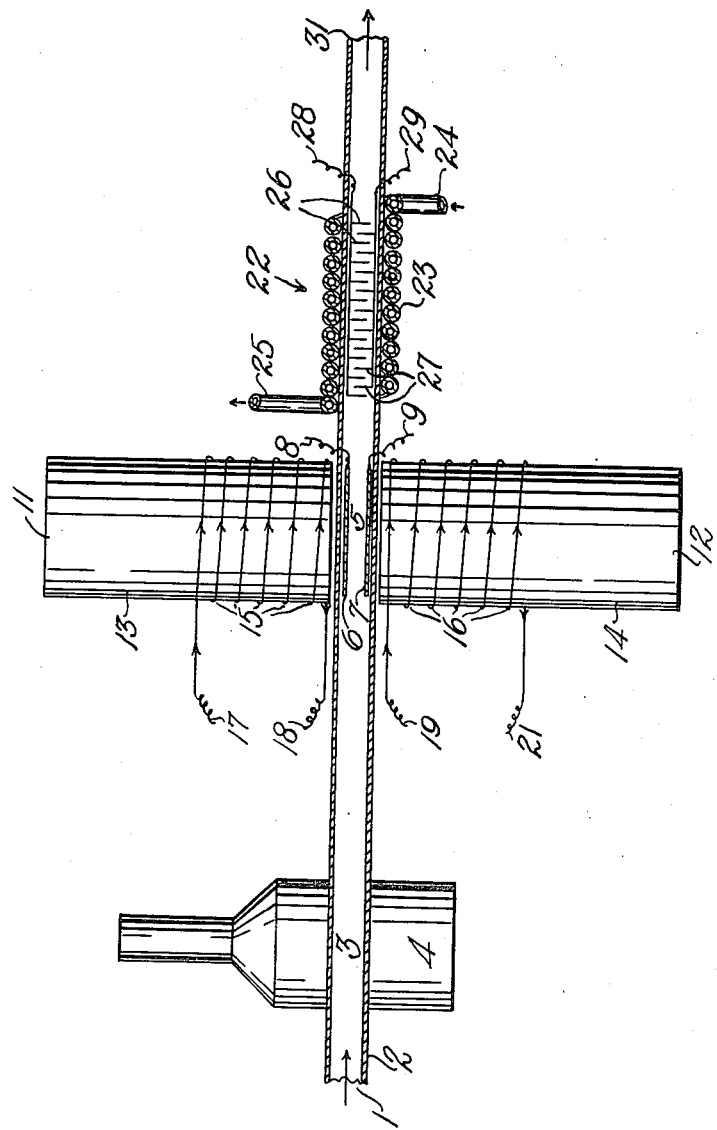
INVENTOR.
William B. Reeves
BY Darby & Darby
Attorneys Patented Dec. 29, 1953

2,664,394

UNITED STATES PATENT OFFICE 2,664,394

ELECTROCHEMICAL CONVERSION OF HYDROCARBONS

William Byron Reeves, Wood River, Ill., assignor to Phillips Petroleum Company, a corporation of Delaware Application November 26, 1948, Serial No. 62,214

3 Claims. (Cl. 204—155)

This invention relates to methods for producing chemical reactions through the instrumentality of, or with the assistance of, magnetic and electrostatic fields within the reaction zone.

The invention is particularly useful in the field of changing the chemical structure of hydrocarbons, although it may be applied to chemical reactions and the treatment of chemicals in other fields and to reactions involving both hydrocarbons and derivatives thereof and other chemical compounds.

It has been previously suggested to use high frequency (up to 20,000 C. P. S.) oscillating electromagnetic fields for the conversion of petroleum hydrocarbons to products such as gasoline. It has also been proposed to crack crude petroleum by the action of a silent or corona discharge or to produce chemical substitution by this type of electric discharge. It has further been proposed to apply a silent electric discharge to methane to produce normal paraffins by disproportionation of the methane, the discharge being produced by a high tension alternating electric field of high frequency.

In accordance with the present invention, the chemical compound or mixture of compounds, is preferably heated and is then introduced into a reaction zone containing both electrostatic and magnetic fields. The desired coordination may be maintained between the electrostatic and magnetic fields so that the atomic and molecular components of the chemical compound or compounds may be individually excited, or energized, or both, to provide the proper conditions for the promotion of the desired chemical reaction. Unexpected and exceptional results have been attained by the use of this method and this apparatus. For example, in the field of reacting or cracking or converting hydrocarbons, it has been found that normal paraffins treated or reacted in accordance with the invention produced a high yield of isoparaffins. These results were not previously accomplished by the application of high frequency electric discharges, either of the sparking or silent type alone, or by the application of a magnetic field alone to the reaction zone.

The rate of feed of the chemical compound, the temperature, pressure, as well as the strength, relative direction and frequency of the electrostatic and magnetic fields may be varied in accordance with the results desired. There is preferably provided a de-ionizing and cooling zone into which the reacted material may be introduced after the principal reaction has taken place, in order to remove uncombined or free charges (ions or electrons, or both) and in order further to stabilize the reaction.

The single figure of the drawing illustrates diagrammatically a suitable apparatus for practicing the invention, in which the feed line and directly associated parts are shown in cross section.

Hydrocarbons, for example, are fed at 1 into the feed line 2 and then into a preheating zone 3. The feed line, including the various zones thereof, may be made of heat resistant glass or other non-magnetic material having low electrical conductivity. The temperature is raised by a preheater 4 to the desired extent, say, 400° F. to 2,000° F. The preheater may conveniently comprise a resistance-wound preheating furnace although other preheating means may be utilized.

From the preheating zone the hydrocarbons are fed to the reaction zone 5 which is provided with high voltage electrodes 6 and 7 inside the zone. The electrodes are respectively connected to high voltage terminals 8 and 9 for the application of the desired electrostatic potential between the electrodes. On the exterior of the reaction zone electromagnets 11 and 12 are proximately and oppositely positioned to furnish the desired magnetic field within the reaction zone. These electromagnets comprise the usual cores 13 and 14 and coils 15 and 16 which are supplied with alternating current by the terminals 17 and 18, 19 and 21, respectively. It is preferred that the core of the magnets be designed for maximum flux density that can be attained in the cross section area of the reaction zone. A relatively low frequency electromagnetic field is preferably produced within the reaction zone, the frequency range being preferably between 40 and 300 C. P. S.

The electrodes 6 and 7 are supplied with a high potential electrostatic charge applied to the terminals 8 and 9. The potential may range from 30,000 volts to in excess of 500,000 volts. The required potential may be produced by any known means, such as high voltage transformers, in association with a rectifier.

From the reaction zone, the effluent is passed to a finishing zone 22 which is preferably a de-ionizing and cooling zone. The cooling may be accomplished, as shown, by a coil 23 surrounding the tube and having an inlet pipe 24 and an outlet pipe 25 for the passage of a coolant continuously around the finishing zone. Intercalated series of plates 26 and 27 are provided in the path of the effluent, and de-ionizing potentials may be applied thereto at terminals 28 and 29. The deionizing and cooling zone effectively stops the reaction and permits the removal of the effluent at 31 for collection.

The apparatus is preferably operated under superatmospheric pressure. Relatively high pressures may be desirable with certain reactions.

*Example*

A feed comprising 98.463 mol per cent propane, 1.13% isobutane and normal butane, and 0.407% of pentane and higher hydrocarbons, was introduced into the apparatus at 1 and preheated to a temperature of about 1000° F. The preheater and reaction zone were filled with twelve mesh pumice stone, and the feed rate of hydrocarbons was between about 3 and about 5 cubic feet per minute. The electromagnet was a converted 440 volt current transformer and 80 volts 60 cycle alternating current was impressed across the electromagnet, giving a current of 4.5 amperes flowing through the coil. About 60,000 volts was applied across the electrodes 6 and 7 and the temperature of the hydrocarbons was 975° F. within the reactor as measured by thermocouple.

The effluent from the reactor was as follows, the parts being expressed in mol percentage:

| | |
|---|---|
| Methane and lighter components | [1] 1.25 |
| Ethane | 0.13 |
| Propane | 93.46 |
| Isobutane | 2.32 |
| Normal butane | 0.69 |
| Isopentane | 0.17 |
| Normal pentane | 0.17 |
| Isohexane | 1.12 |
| Normal hexane | 0.13 |
| Isoheptane and heavier | 0.56 |
| | 100.00 |

[1] Approximately half hydrogen.

It will be noted that considerably more isobutane was produced than originally contained in the feed, and that the total quantity of isopentane, isohexane, isoheptane and heavier hydrocarbons was considerably in excess of the pentanes and higher hydrocarbons introduced in the feed.

It is also to be noted that the major proportion of the feed stock was propane, which is a non-polar material at normal temperatures. At elevated temperatures, such as used in the example, the propane molecules produce a short-life free radical or polar radical. It appears that the propane molecules were oriented or aligned in the electrostatic field and were converted by the simultaneous action of the electromagnetic field, as shown by the production of an increased quantity of iso-hydrocarbons and an increased quantity of normal hydrocarbons having more than three carbon atoms. The apparatus converted about 5% of the propane in the feed to yield an effluent consistency, primarily of saturated hydrocarbons. Over 50% of the propane converted was recovered as isoparaffins of higher molecular weight than the propane.

While the example relates to the production of isoparaffins from normal paraffins, it is apparent that the invention may be utilized to obtain many and varied reactions of other hydrocarbons and other chemical compounds by the conjoint application of a magnetic field of low frequency and a high potential electrostatic field. It is of course to be understood that the reaction conditions may be varied within comparatively wide limits as stated above.

While the method and apparatus of this invention have been described in detail as applied to a particular reaction, the invention may be advantageously utilized for a wide variety of chemical reactions including petroleum cracking, isomerization, polymerization, alkylation, hydrogenation, dehydrogenation, disproportionation, hydrohalogenation, dehalogenation, nitration, and synthesis reactions involving hydrogen and carbon oxides.

The method and apparatus of this invention may be used with various catalysts to increase catalyst activity, efficiency and yield, and to increase catalyst life. The catalyst is of course not confined to pumice stone, and the reaction chamber may contain other catalytic materials, for example, those employed as fixed bed catalysts for hydrogenation, dehydration, and other petroleum reactions including those mentioned in this specification.

In view of the many changes and modifications that may be made without departing from the principles underlying the invention, reference should be made to the appended claims for an understanding of the scope of the protection afforded the invention.

What is claimed is:

1. The method of converting a hydrocarbon gas composed essentially of propane, and including residual amounts of paraffins of higher and lower molecular weight, to isoparaffins of higher molecular weight than propane, which comprises heating said propane in gaseous phase to a temperature in the range of about 400° F. to about 2000° F., passing said heated propane gas through a zone subjected to a superimposed high potential electrostatic field and an oscillating electromagnetic field of a frequency in the range between 40 and 300 cycles per second, cooling the gaseous material so treated and withdrawing a mixture having an increased content of hydrocarbons of a higher molecular weight than the original propane.

2. A method in accordance with claim 1 in which said gas mixture is subjected to deionizing potentials in the cooling zone.

3. A method of forming isobutane and higher molecular weight isoparaffin hydrocarbons from a gas composed essentially of propane, with residual amounts of higher molecular weight paraffin hydrocarbons, comprising heating the said propane gas to about 1000° F., passing said heated gas mixture through a zone subjected to a superimposed high potential electrostatic field and an oscillating electromagnetic field of a frequency in the range between 40 and 300 cycles per second, cooling the material so treated and withdrawing a hydrocarbon mixture of an increased isoparaffin content, having a molecular weight greater than that of the original propane gas.

WILLIAM BYRON REEVES.

References Cited in the file of this patent

UNITED STATES PATENTS

| Number | Name | Date |
|---|---|---|
| 935,942 | Stewart | Oct. 5, 1909 |
| 1,054,886 | Wielgolaski | Mar. 4, 1913 |
| 1,902,384 | Steinbuch et al. | Mar. 21, 1933 |
| 2,023,754 | Uhlmann | Dec. 10, 1935 |
| 2,257,177 | Luster | Sept. 30, 1941 |
| 2,583,899 | Smith | Jan. 29, 1952 |